US005659171A

United States Patent [19]

Young et al.

[11] Patent Number: 5,659,171

[45] Date of Patent: Aug. 19, 1997

[54] MICRO-MINIATURE DIAPHRAGM PUMP FOR THE LOW PRESSURE PUMPING OF GASES

[75] Inventors: Robert M. Young, Pittsburgh; Carl B. Freidhoff, Murrysville, both of Pa.

[73] Assignee: Northrop Grumman Corporation, Los Angeles, Calif.

[21] Appl. No.: 320,618

[22] Filed: Oct. 7, 1994

Related U.S. Application Data

[63] Continuation-in-part of Ser. No. 124,873, Sep. 22, 1993, Pat. No. 5,386,115.

[51] Int. Cl.[6] .......... B01D 59/44; H01J 49/00

[52] U.S. Cl. .......... 250/289; 250/231

[58] Field of Search .......... 250/288, 289, 250/281

[56] References Cited

U.S. PATENT DOCUMENTS

| | | | |
|---|---|---|---|
| 4,864,824 | 9/1989 | Gabriel et al. | 60/527 |
| 4,938,742 | 7/1990 | Smits | 604/67 |
| 5,061,914 | 10/1991 | Busch et al. | 60/527 |
| 5,079,920 | 1/1992 | Whitehead et al. | 60/527 |
| 5,325,880 | 7/1994 | Johnson et al. | 60/527 |
| 5,386,115 | 1/1995 | Freidhoff et al. | 250/281 |
| 5,466,932 | 11/1995 | Young et al. | 250/29 |

OTHER PUBLICATIONS

W.J. Spencer, "An Electronically Controlled Piezoelectric Insulin Pump and Valves", IEEE Trans. Sonics and *Ultrasonics,* vol. SU-25, No. 3, p. 153 (1978).

H.T.G. VanLantel et al., "A Piezoelectric Micropump Based on Micromachining of Silicon", 15 Sensors And *Actuators* 153 (1988).

J.G. Smits, "Piezoelectric Micropump With Three Valves Working Peristaltically", A21 *Sensors and Actuators* 203 (1990).

J. W. Judy et al., "Surface-Machined Micromechanical Membrane Pump", *Proceedings of IEEE Micro Electro Mechanical Systems* (*Nara, Japan*), (1991).

F.C.M. VanDePol et al., "A Thermopneumatic Micropump Based On Micro-engineering Techniques", A21-A23 *Sensors and Actuators* 198 (1990).

F.C.M. VanDePol et al., "A Thermopneumatic Actuation Principle For A Microminiature Pump And Other Micromechanical Devices", 17 *Sensors and Actuators* 139 (1989).

D. Stoeckel, "Status and Trends in Shape Memory Technology", 3rd Intl. Conf. On New Actuators (*Bremen, Germany*), p. 79 (1992).

*Primary Examiner*—Bruce Anderson

*Attorney, Agent, or Firm*—Walter G. Sutcliff

[57] ABSTRACT

A pump is provided for use in a solid state mass-spectrograph for analyzing a sample gas. The spectrograph is formed from a semiconductor substrate having a cavity with an inlet, gas ionizing section adjacent the inlet, a mass filter section adjacent the gas ionizing section and a detector section adjacent the mass filter section. The pump is connected to each of the sections of said cavity and evacuates the cavity and draws the sample gas into the cavity. The pump includes at least one diaphragm and electrically-actuated resistor. The resistor generates heat upon electrical actuation thereby causing the diaphragm to accomplish a suction stroke which evacuates the cavity and draws the sample gas into the cavity. Preferably, the diaphragm is formed from a bilayered metal material having different thermal expansion rates or from a shape memory alloy.

11 Claims, 6 Drawing Sheets

FIG. 5
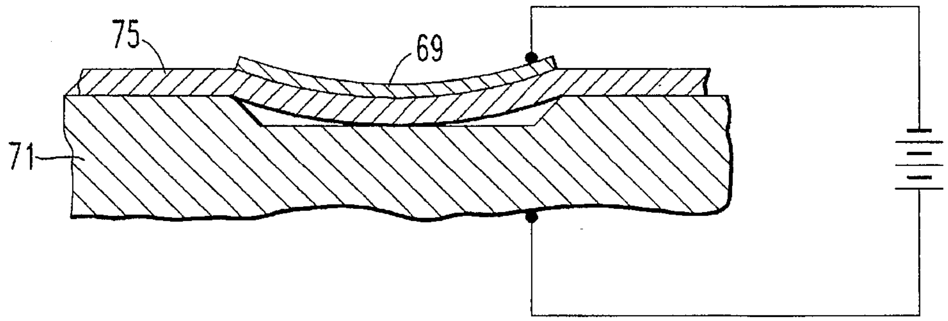
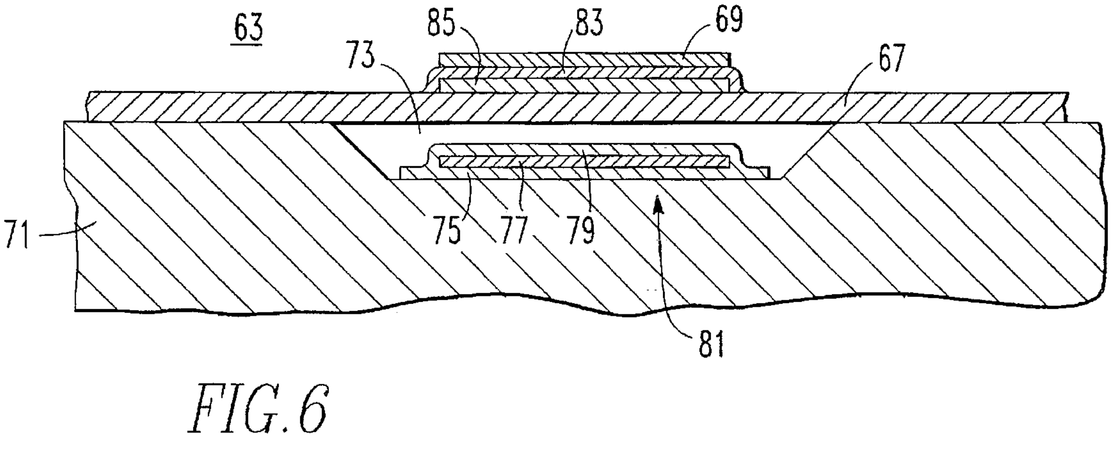
FIG. 6

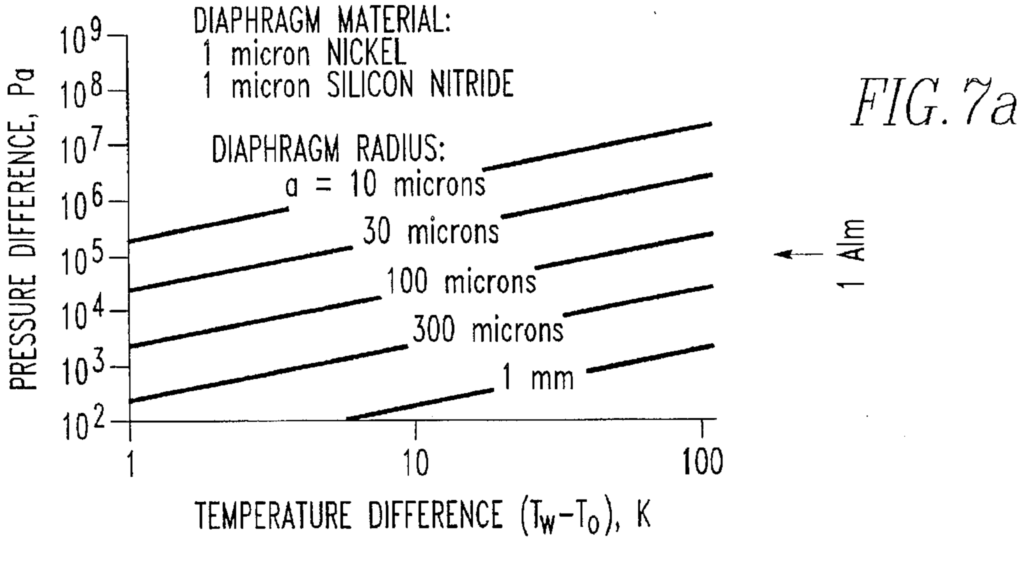
FIG. 7a
FIG. 7b
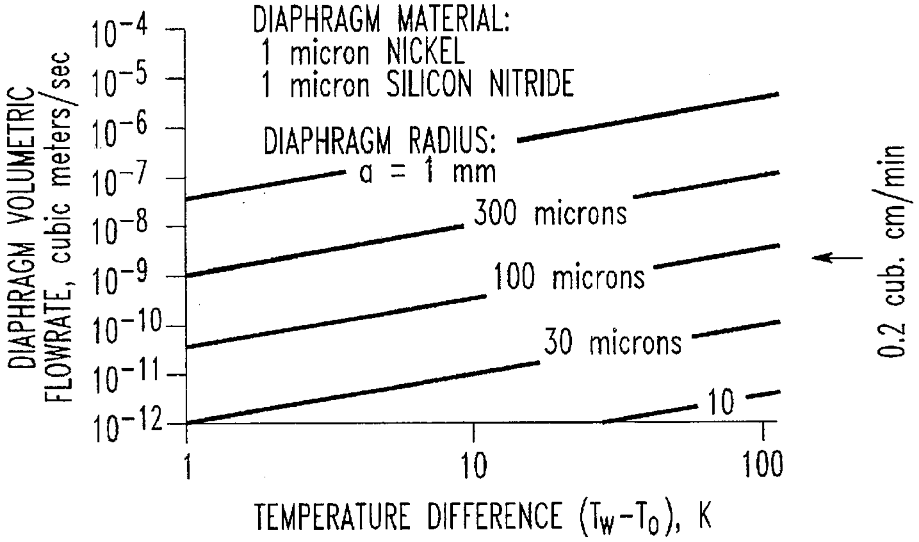
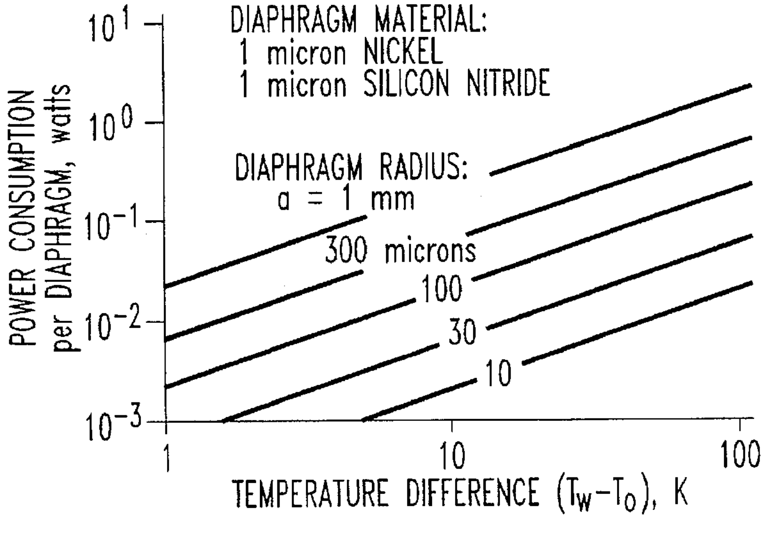
FIG. 7c

MICRO-MINIATURE DIAPHRAGM PUMP FOR THE LOW PRESSURE PUMPING OF GASES

CONTINUING APPLICATION

This application is a continuation-in-part of application Ser. No. 08/124,873, filed Sep. 22, 1993 now U.S. Pat. No. 5,386,115.

GOVERNMENT CONTRACT

The government of the United States of America has rights in this invention pursuant to Contract No. 92-F-141500-000, awarded by the United States Department of Defense, Defense Advanced Research Projects Agency.

BACKGROUND OF THE INVENTION

1. Field of the Invention

This invention relates to a gas-detection sensor and more particularly to a solid state mass spectrograph which is micro-machined on a semiconductor substrate, and, even more particularly, to a diaphragm pump for the low pressure pumping of gases used in such a mass spectrograph.

2. Description of the Prior Art

Various devices are currently available for determining the quantity and type of molecules present in a gas sample. One such device is the mass-spectrometer.

Mass-spectrometers determine the quantity and type of molecules present in a gas sample by measuring their masses and intensity of ion signals. This is accomplished by ionizing a small sample and then using electric and/or magnetic fields to find a charge-to-mass ratio of the ion. Current mass-spectrometers are bulky, bench-top sized instruments. These mass-spectrometers are heavy (100 pounds) and expensive. Their big advantage is that they can be used in any environment.

Another device used to determine the quantity and type of molecules present in a gas sample is a chemical sensor. These can be purchased for a low cost, but these sensors must be calibrated to work in a specific environment and are sensitive to a limited number of chemicals. Therefore, multiple sensors are needed in complex environments.

A need exists for a low-cost gas detection sensor that will work in any environment. U.S. patent application Ser. No. 08/124,873, filed Sep. 22, 1993, hereby incorporated by reference, discloses a solid state mass-spectrograph which can be implemented on a semiconductor substrate. FIG. 1 illustrates a functional diagram of such a mass-spectrograph 1. This mass-spectrograph 1 is capable of simultaneously detecting a plurality of constituents in a sample gas. This sample gas enters the spectrograph 1 through dust filter 3 which keeps particulate from clogging the gas sampling path. This sample gas then moves through a sample orifice 5 to a gas ionizer 7 where it is ionized by electron bombardment, energetic particles from nuclear decays, or in a radio frequency induced plasma. Ion optics 9 accelerate and focus the ions through a mass filter 11. The mass filter 11 applies a strong electromagnetic field to the ion beam. Mass filters which utilize primarily magnetic fields appear to be best suited for the miniature mass-spectrograph since the required magnetic field of about 1 Tesla (10,000 gauss) is easily achieved in a compact, permanent magnet design. Ions of the sample gas that are accelerated to the same energy will describe circular paths when exposed in the mass-filter 11 to a homogenous magnetic field perpendicular to the ion's direction of travel. The radius of the arc of the path is dependent upon the ion's mass-to-charge ratio. The mass-filter 11 is preferably a Wien filter in which crossed electrostatic and magnetic fields produce a constant velocity-filtered ion beam 13 in which the ions are disbursed according to their mass/charge ratio in a dispersion plane which is in the plane of FIG. 1.

A vacuum pump 15 creates a vacuum in the mass-filter 11 to provide a collision-free environment for the ions. This vacuum is needed in order to prevent error in the ion's trajectories due to these collisions.

The mass-filtered ion beam is collected in a ion detector 17. Preferably, the ion detector 17 is a linear array of detector elements which makes possible the simultaneous detection of a plurality of the constituents of the sample gas. A microprocessor 19 analyses the detector output to determine the chemical makeup of the sampled gas using well-known algorithms which relate the velocity of the ions and their mass. The results of the analysis generated by the microprocessor 19 are provided to an output device 21 which can comprise an alarm, a local display, a transmitter and/or data storage. The display can take the form shown at 21 in FIG. 1 in which the constituents of the sample gas are identified by the lines measured in atomic mass units (AMU).

Preferably, mass-spectrograph 1 is implemented in a semiconductor chip 23 as illustrated in FIG. 2. In the preferred spectrograph 1, chip 23 is about 20 mm long, 10 mm wide and 0.8 mm thick. Chip 23 comprises a substrate of semiconductor material formed in two halves *25a* and *25b* which are joined along longitudinally extending parting surfaces *27a* and *27b*. The two substrate halves *25a* and *25b* form at their parting surfaces *27a* and *27b* an elongated cavity 29. This cavity 29 has an inlet section 31, a gas ionizing section 33, a mass filter section 35, and a detector section 37. A number of partitions 39 formed in the substrate extend across the cavity 29 forming chambers 41. These chambers 41 are interconnected by aligned apertures 43 in the partitions 39 in the half *25a* which define the path of the gas through the cavity 29. Vacuum pump 15 is connected to each of the chambers 41 through lateral passages 45 formed in the confronting surfaces *27a* and *27b*. This arrangement provides differential pumping of the chambers 41 and makes it possible to achieve the pressures required in the mass filter and detector sections with a miniature vacuum pump.

In order to evacuate cavity 29 and draw a sample of gas into the spectrograph 1, pump 15 must be capable of operation at very low pressures. Moreover, because of size constraints, pump 15 must be micro-miniature in size. Although a number of prior art micro-pumps have been described, these pumps have generally focused on the pumping of liquids. In addition, micro-pumps have been used to pump gases near or higher than atmospheric pressure. Moreover, such micro-pumps are fabricated by bulk micro-machining techniques wherein several silicon or glass wafers are bonded together. This is a cumbersome procedure which is less than fully compatible with integrated circuit applications. Accordingly, there is a need for a micro-miniature diaphragm pump capable of pumping gases at low pressures which can be fabricated with ease.

SUMMARY OF THE INVENTION

A micro-miniature pump is provided for use in a solid state mass-spectrograph which can pump gases at low pressure. The solid state mass-spectrograph is constructed upon a semiconductor substrate having a cavity provided therein. The pump is connected to various portions of the cavity, thereby allowing differential pumping of the cavity. The pump preferably comprises at least one diaphragm having an electrically-actuated resistive means connected thereto. Upon electrical actuation, the resistive means generates heat which causes the diaphragm to accomplish a suction stroke. This suction stroke evacuates the portion of the cavity to which the pump is connected. Preferably, the diaphragm is formed from a bilayer material or shape memory alloy material, both of which create a suction stroke upon heating. If desired, the pumps may be ganged, in series or parallel, to increase throughput or to increase the ultimate level of vacuum achieved.

BRIEF DESCRIPTION OF THE DRAWINGS

A full understanding of the invention can be gained from the following description of the preferred embodiments when read in conjunction with the accompanying drawings in which:

FIG. 5 is a schematic view of the pump of FIGS. 4A and 4B actuated as a valve.

FIG. 6 is a side cross sectional view of the pump of FIGS. 4A and 4B showing the fabrication of the pump.

FIGS. 7*a*, 7*b* and 7*c* are three graphs showing modeling predictions for the performance of the pump of FIGS. 4A and 4B.

DETAILED DESCRIPTION OF THE PREFERRED EMBODIMENTS

Figure 1:
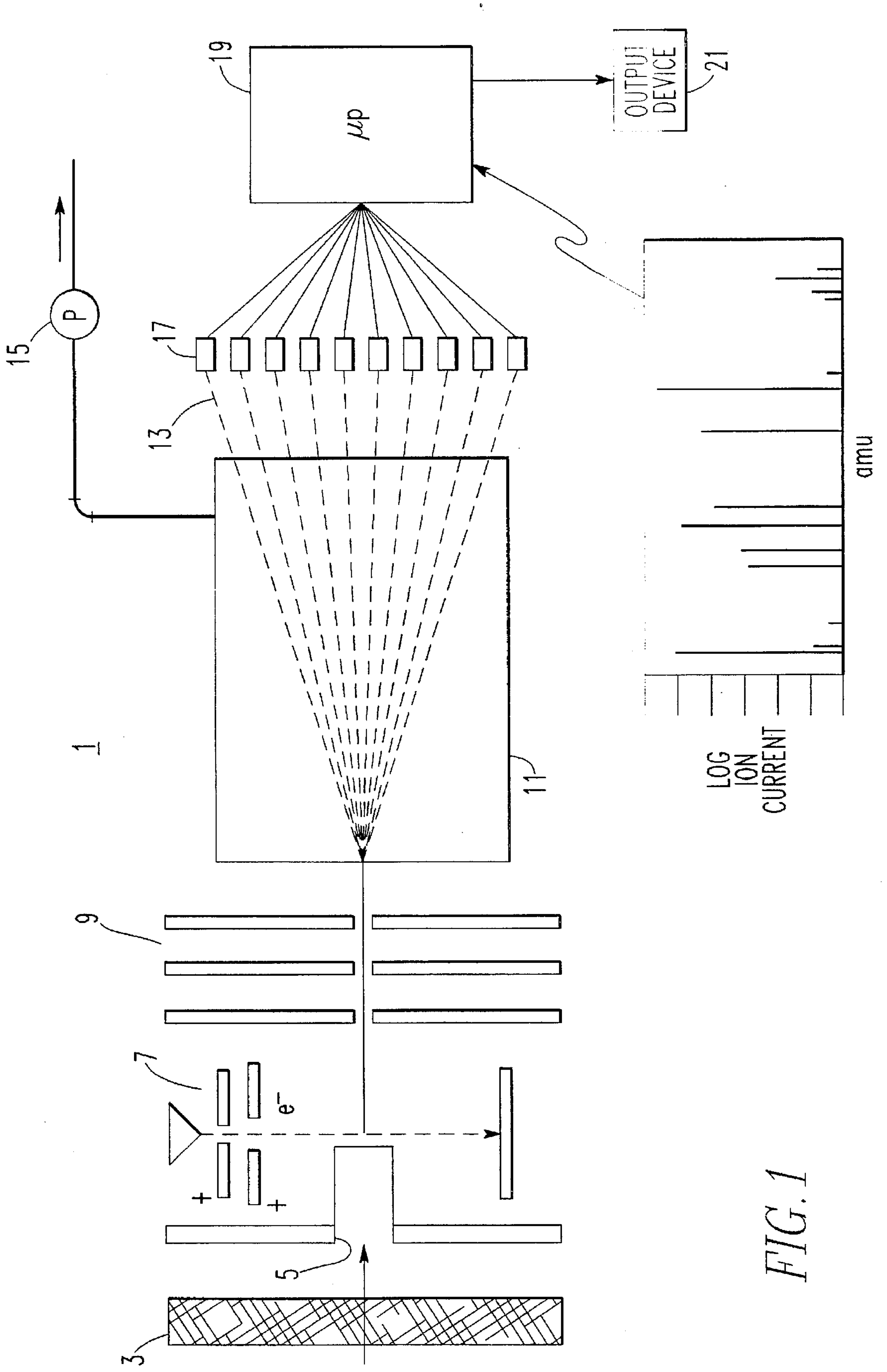
FIG. 1 is a functional diagram of a solid state mass-spectrograph in accordance with the invention.
Figure 2:
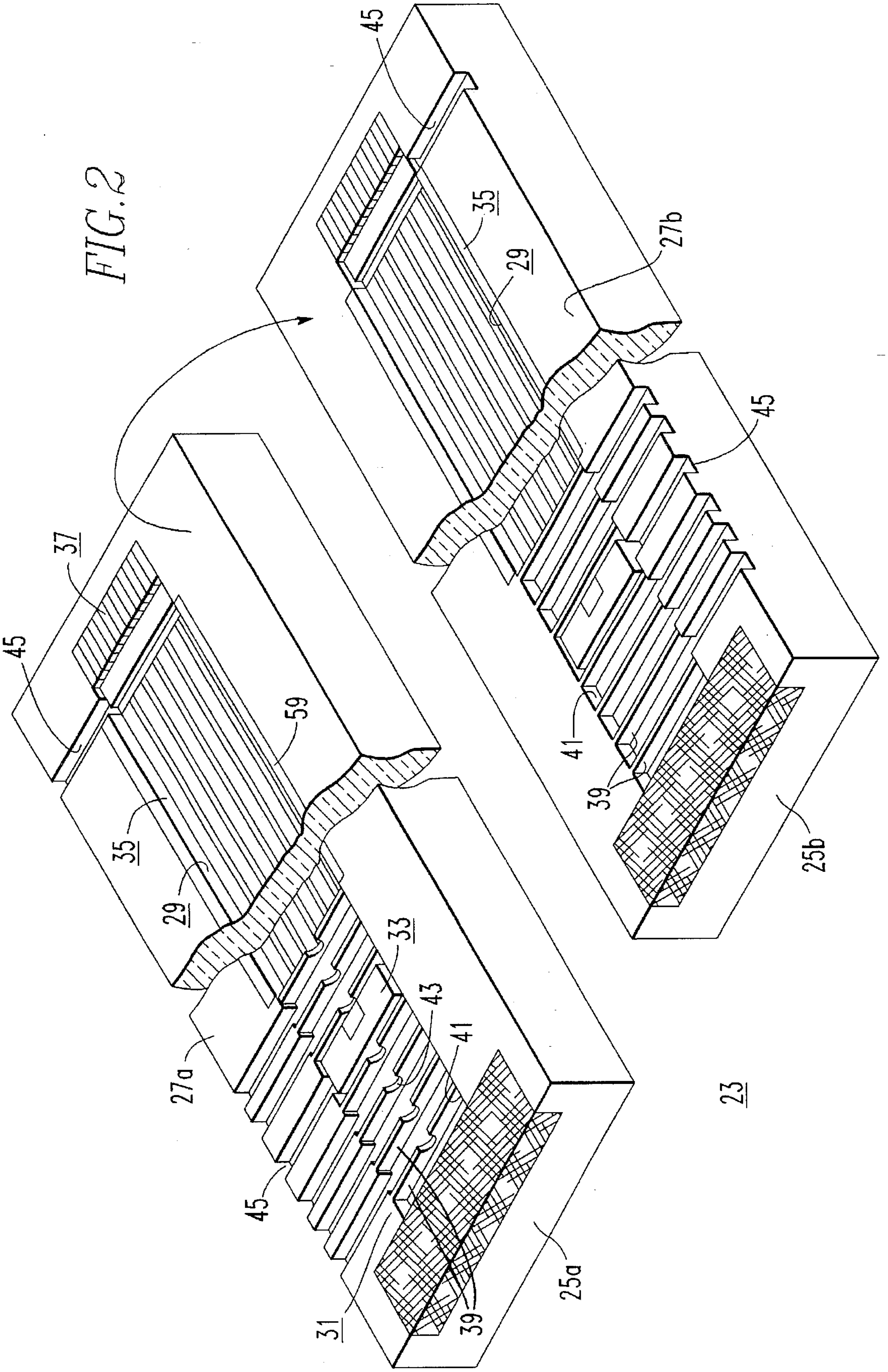
FIG. 2 is a isometric view of the two halves of the mass-spectrograph of the invention shown rotated open to reveal the internal structure.
Figure 3:
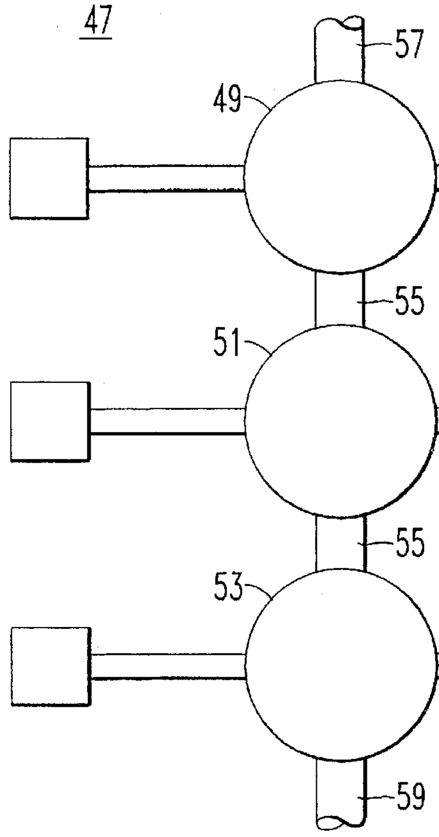
FIG. 3 is a schematic view of a three-membrane diaphragm pump formed in accordance with the present invention.

FIG. 3 shows a top view of the presently preferred basic pumping unit 47, consisting of three diaphragms 49, 51 and 53 which are connected by gas channels 55. In addition, diaphragm 49 is connected to gas inlet 57 and diaphragm 53 is connected to gas outlet 59. When electrically actuated by the highly conductive electrical lead 61, these diaphragms 49, 51, and 53 flex upwards and/or downwards to produce forces in diaphragms 49, 51, and 53 sufficiently large to do the suction work against the exterior ambient atmosphere.

Usually, gases are pumped in diaphragm pump 47 in a peristaltic fashion. Alternatively, the first diaphragm 49 can be used as an inlet valve, the middle diaphragm 51 used as the pump, and the third diaphragm 53 used as an outlet valve. The diaphragms 49, 51 and 53 and pumps 47 may be ganged, in series or parallel, to increase throughput or to increase the ultimate level of vacuum achieved.

Pump 47 is capable of evacuating gases to low pressures, and is completely surface micromachined. Furthermore, the actuating force for pump 47 is the thermal expansion difference between a bilayered membrane or the phase change of a shape memory alloy. Unlike prior art micro-pumps, pump 47 accomplishes a suction stroke upon heating, not a compression stroke. No check valves are required in pump 47. Accordingly, pump 47 can function at low pressures. All valving is active and intended for low pressure work.

Figure 4A:
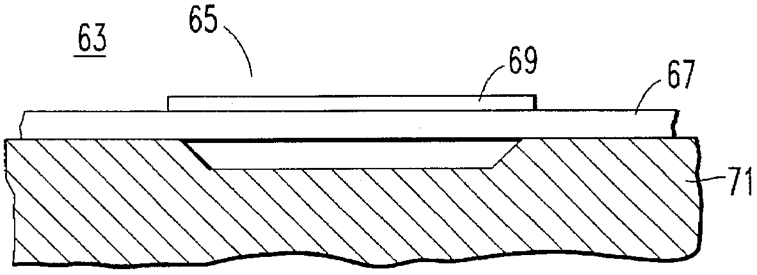
FIGS. 4A and 4B are schematic views of a first preferred embodiment of the pump of FIG. 3 illustrating the actuation principle for the suction stroke.
Figure 4B:
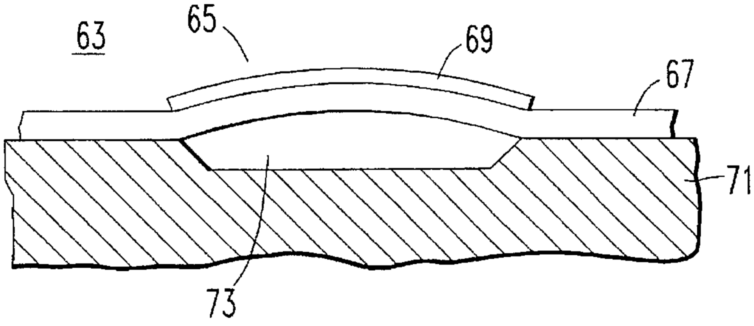

The actuation principle driving a bilayer diaphragm pump 63 is the difference in thermal expansion in a membrane 65 between two bonded layers 67 and 69. Conceptually, this is shown in FIGS. 4A and 4B. For example, the bottom layer 67 of the membrane 65 may be formed from low-stress silicon nitride, and the top layer 69 of nickel or nichrome. The resistive metal layer 69 is ohmically heated by passing a current through it. Since nickel expands about four times more than silicon nitride, the bilayer membrane 65 will bend upward away from the substrate 71. This creates a cavity 73, forming the basis for a vacuum pump 63.

Conceptually, a valve may be created from pump 63 by inverting the stack 65 and placing the higher expansion material 69 on the inside. However, since the structure in FIGS. 4A and 4B can be fabricated with an upper electrode 69 separated from the lower electrode (the silicon substrate 71) by a dielectric 75, a bimetallic diaphragm pump 63 can be alternatively electrostatically clamped shut and act as a valve without additional components as shown in FIG. 5. This is an important feature to save power, as thermal conductive heat loss from the ohmical element to the substrate 71 may be substantial. Thus, while the thermal expansion force is the driving element to produce the required suction work against the atmosphere, the electrostatic clamping can be used to hold shut the cavities 73.

The pumping chamber for pump 63 can be fabricated in a manner similar to that for an existing electrostatic pump used for the pumping of liquids. The fabrication process differs from the prior art designs by specifying a top resistive layer formed from a resistive material such as Nickel or NiChrome.

FIG. 6 shows a cross sectional view of one diaphragm of pump 63. To fabricate this pump, a silicon wafer substrate 71 is first patterned and etched to form the gas cavity 73. This chamber is typically 1–6 microns in depth, with a diameter of 50–1000 microns.

As an option, a layer of silicon nitride dielectric 75, followed by a patterned layer of doped polycrystalline silicon 77 and another layer of silicon nitride 79, may be deposited into the bottom of the cavity 73. This forms an optional electrostatic electrode 81, useful in ensuring a tight seal and high clamping forces when the diaphragm touches the bottom of the cavity 73. Alternatively, the silicon substrate 71 itself may be used as a common lower electrode.

A layer of silicon dioxide, not shown, is next deposited and planarized to fill the cavity 73. This layer is temporary, and forms a sacrificial material to be removed later in the fabrication.

A layer of low-stress silicon nitride 67 is next deposited. Typically this layer is 1 micron in thickness. This forms the main membrane to the diaphragm pump.

Optionally, two more layers of silicon nitride 83 and patterned doped poly-crystalline silicon 85, can be deposited. These layers 83 and 85 form an upper electrostatic electrode.

The ohmic resistive layer 69 is next deposited and patterned. The diameter of this metallic element may be smaller than the cavity diameter, as shown schematically in FIG. 6, or it may be larger as indicated in. FIGS. 4A and 4B.

Once all of the layers have been deposited and patterned, the entire wafer is then covered in a protective encapsulant, typically 0.5 microns of PECVD amorphous silicon. Holes are etched through this encapsulant to permit hydrofluoric acid to dissolve the sacrificial silicon oxide layer in the cavity 73. The encapsulant protects the other features from attack by the acid. These holes are then sealed by sputtered silicon nitride caps.

The heated bilayer membrane pump 63 is now formed and air-tight. All processing has been accomplished from the front surface of the wafer. No back side etching of the wafers is needed, nor do other wafers need to be bonded to the top or bottom of the patterned wafer. All etching and depositions have been carried out by surface micro-machining.

FIGS. 7*a*, 7*b* and 7*c* show the results of a simple calculation of the pressure difference a bilayer diaphragm can exert, modeling the membrane as a two layer plate which curves into a spherical shell upon heating to temperature of Tw from an initial temperature To. As shown in FIG. 7*a* pressures exceeding one atmosphere are obtained for temperature differences approaching 100° C. for membranes with radii less than 100 microns.

The cooldown time of the bilayered structure determines the cycle time. A simple heat transfer model shows that by far, most of the heat is lost to the silicon substrate, whose thermal conductivity thus controls the time constant. Coupling this model with the volumetric displacement per cycle from the above structure model, allows prediction of the pump's flowrate, as also shown in FIG. 7*b*. Just as in the pressure plot, flowrate increases with higher temperature differences. As might be expected from intuition, the larger flowrates occur for larger diameters. Current preferred designs of mass spectrograph 1 require a flowrate of 0.2 sccm. This number is exceeded for diaphragms greater than 100 microns in radius.

The model also predicts in FIG. 7*c* the power consumption for a single diaphragm. The power levels range from 1 milliWatt up to 1 Watt. This analysis suggests that the silicon chip may need to be placed on a heat sink for optimal operation.

The modeling presented in FIG. 7 indicates that a bilayer diaphragm pump 63 produces sufficient pressure difference and flowrate at a reasonable power level to be useful for drawing gas through a miniature sensor.

Actuation of a diaphragm pump can also be achieved by the shrinkage of one member. Shape memory alloys are a class of materials, that when heated above a certain temperature, undergo a crystallomorphic phase change. This creates a change in the metal's strain, and a movement which can be utilized as an actuator. Shape memory alloys have already been applied commercially to control macroscopic water control valves.

The large forces and displacements found in shape memory alloy actuators are due to a thermoelastic, martensitic phase transformation. The effect has been noted in some nickel-titanium (notably Nitinol) and copper based alloys. Below its martensitic transformation temperature, the shape memory alloy must be stretched from its initial neutral position by an outside force. Upon heating above the transformation temperature, the shape memory alloy returns to the initial position, although some hysteresis may be involved. To make a cyclical actuator the stretching force must be reapplied after cooldown.

Figure 8:
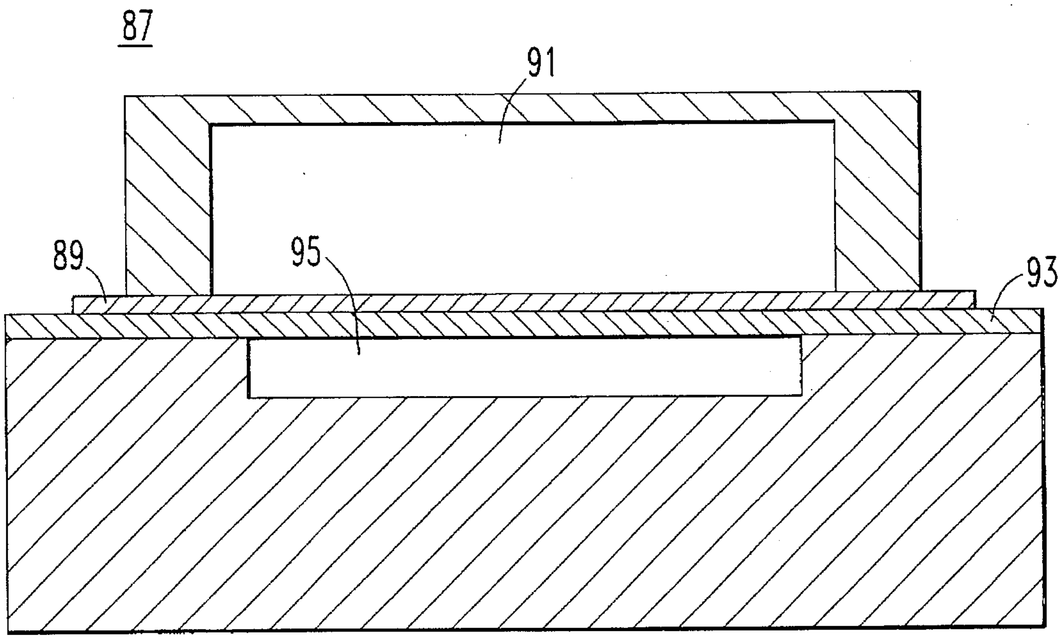
FIG. 8 is a schematic view of a second preferred pump in accordance with the present invention.
Figure 9:
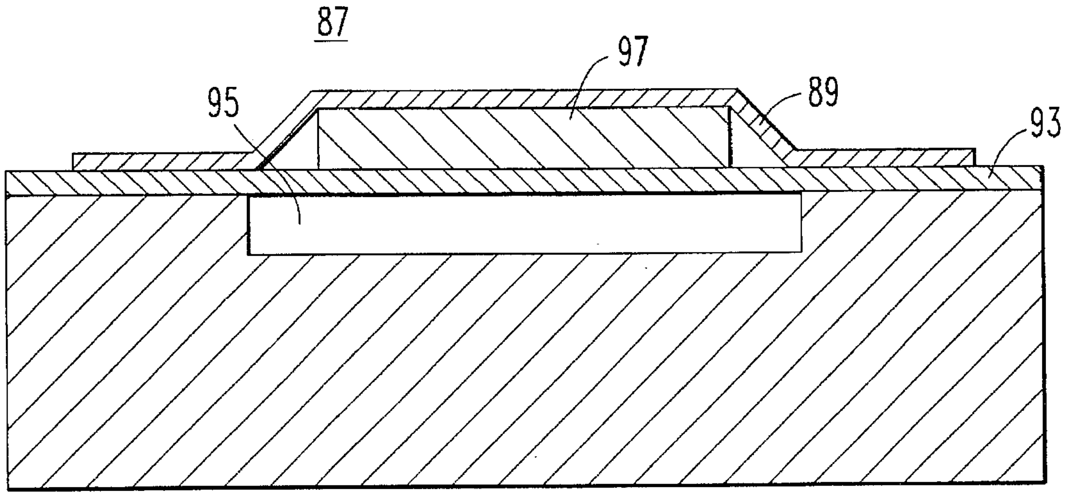
FIG. 9 is an alternative embodiment for the pump of FIG. 9.

The implementation of a shape memory alloy actuator on a silicon cavity with membrane is schematically shown in FIGS. 8 and 9. In FIG. 8, a pump 87 is fabricated similarly to the bilayer pump described above, but with Nitinol or other shape memory alloy material 89 substituted for the thermal expansion bilayer material. The restoring force is provided by the bulk micro-machined sealed cavity 91 placed above the membrane 89. The gas within cavity 91 is pressurized, preferably to greater than 2 atmospheres.

When cold, the shape memory alloy membrane 89 is placed into tension by the pressurized gas in cavity 85, thereby stretching the silicon nitride diaphragm 93 downwards. Upon heating, the shape memory alloy membrane 89 returns to its initial, upwards position, working against the sealed gas pressure in cavity 91, and creating a vacuum inside of the vacuum pumping chamber 95. Valving and thermal dissipation aspects are similar to the bilayer actuator discussed above.

A second approach to using shape memory alloy actuators 89 on a diaphragm vacuum pump 87 is shown in FIG. 9. This approach eliminates the need for the sealed gas chamber 91 and thus eliminates its bulk micro-machining. In this embodiment, the entire structure of pump 87 may be fabricated by surface micro-machining. In this embodiment, the cycle and restoring force is provided by the shape memory alloy 89 acting against a fulcrum spacer 97 and the exterior ambient atmosphere.

In operation, the shape memory alloy 89 is stretched over the fulcrum spacer 97. When actuated, shape memory alloy 89 pushes the diaphragm 93 down. The inherent tensile stress of the diaphragm 93 acts as the return spring. The use of the fulcrum spacer 97 and diaphragm 93 makes this embodiment of pump 87 the microscopic version of a sealed piston pump which can be used as both a pressure pump and a vacuum pump.

The high force and displacements for a shape memory alloy occur when the shape memory alloy is heated beyond its martensitic transformation temperature. For cyclical actuators requiring lifetimes greater than 100,000 cycles, the maximum usable strain of a shape memory alloy material should be 1% or less, although strains as large as 8% can be withstood. Thus, for a 500 micron diameter diaphragm, a 1% strain would convert to a 35 micron displacement.

Since shape memory alloy actuators need only be taken through temperature changes of 25°–50° C. (as opposed to the 100° C. needed for bilayers in thermal expansion), the heat which needs to be dissipated each cycle is less, allowing faster cycle times. Coupled with the higher displacements, this means higher gas flowrates can be achieved using shape memory alloy actuated pump 87. A diaphragm pump with a diameter between 300–1000 microns is estimated to meet the flowrate requirements for the mass spectrograph 1. Relaxation of the displacement requirement will mean higher lifetimes.

Temperature difference cycles as low as 25° C. can be found in some materials. This is about one-quarter of the temperature difference needed for the bilayer pump 63, implying one-quarter the power consumption (i.e., dropping the power consumption into the 2.5–250 milliWatt range). Further gains can be realized in the shape memory alloy actuated pump 87, in that the entire diaphragm need not be heated, rather just an annulus around the edges. This means a reduced ohmic load on the pump of at least a factor of 25 or better. Together, this means that a shape memory alloy actuated pump 87 will have the same or better pressure and flowrate performance with $1/100^{th}$ the power consumption of a bilayer thermal expansion pump 63, dropping the power consumption to 0.01–10 milliWatts per diaphragm.

With the high force/high strain combination of shape memory alloys, larger displacement and pressure differential pumps 87 can be fabricated, compared to the bilayered pumps 63. Thus, gas throughput and ultimate pressure are enhanced, at greatly reduced power.

The pumps of the present application have been described in use with a miniaturized mass spectrograph. It is to be distinctly understood that the pumps of the present invention can be used in other applications. Moreover, it is also to be distinctly understood that the pumps of the present invention can be used to pump both liquids as well as gases and can be used in other applications including, but not limited to, coolant transfer systems for radar transmit/receive modules and in process control applications.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims in any and all equivalents thereof.

We claim:

1. A pump for use in a solid state mass spectrograph for analyzing a sample gas, said mass spectrograph being formed from a semiconductor substrate having a cavity with an inlet, a gas ionizing section adjacent said inlet, a mass filter section adjacent said gas ionizing section and a detector section adjacent said mass filter section, said pump being connected to said cavity, said pump comprising at least one electrically-actuated diaphragm means, said diaphragm means accomplishing a suction stroke upon electrical actuation, whereby said suction stroke evacuates said cavity and draws said sample gas into said cavity wherein said diaphragm means is a bilayer material formed from a resistive metal layer applied on top of a low-stress material, said resistive layer being ohmically heated by passing a current through it, said heated metal layer expanding more than said low-stress material, thereby causing said diaphragm to bend upward.

2. The pump of claim 1 wherein said resistive metal layer is formed from one of nickel and nichrome.

3. The pump of claim 1 wherein said low-stress material is formed from silicon nitride.

4. The pump of claim 1 further comprising an upper electrostatic electrode provided between said low stress material and said resistive metal layer, said upper electrostatic layer formed of a layer of silicon nitride and a layer of doped polycrystalline silicon.

5. The pump of claim 4 further comprising a lower electrostatic electrode provided within said cavity, said lower electrostatic electrode formed from a layer of doped polycrystalline silicon encapsulated between two layers of silicon nitride.

6. The pump of claim 4 wherein said ohmic resistive layer is formed from one of nickel and nichrome.

7. The pump of claim 1 wherein said diaphragm means is formed from a membrane and a shape memory alloy, wherein upon the application of heat from a electrical resistive means, said shape memory alloy bends said membrane upward from said cavity.

8. The pump of claim 7 wherein said shape memory alloy is one of a nickel-titanium alloy and a copper-based alloy.

9. The pump of claim 8 wherein a pressurized cavity is provided above said shape metal alloy, said pressurized cavity providing the restoring force to said shape metal alloy.

10. The pump of claim 8 wherein a fulcrum is provided between said membrane and said shape memory alloy, said fulcrum providing the restoring force to said shape memory alloy.

11. A pump for use in a solid state mass spectrograph for analyzing a sample gas, said mass spectrograph being formed from a semiconductor substrate having a cavity with an inlet, said pump being connected to said cavity and comprising at least one electrically-actuated diaphragm means, said diaphragm means accomplishing a suction stroke upon electrical actuation, whereby said suction stroke evacuates said cavity and draws said sample gas into said cavity wherein said diaphragm means comprises a bilayer material formed from a resistive metal layer applied on top of a low-stress material, said resistive layer being ohmically heated by passing a current through it, said heated metal layer expanding more than said low-stress material, thereby causing said diaphragm to bend upward.

* * * * *